United States Patent
Dreier

(10) Patent No.: US 8,019,826 B2
(45) Date of Patent: Sep. 13, 2011

(54) RELIABLE RECEPTION OF MESSAGES WRITTEN VIA RDMA USING HASHING

(75) Inventor: Roland Dreier, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 12/240,830

(22) Filed: Sep. 29, 2008

(65) Prior Publication Data

US 2010/0082766 A1     Apr. 1, 2010

(51) Int. Cl.
*G06F 15/167* (2006.01)
(52) U.S. Cl. ......... 709/216; 709/217; 709/249; 719/313
(58) Field of Classification Search .......... 709/212–216, 709/219, 249, 217; 370/392, 412; 719/313
See application file for complete search history.

(56) References Cited

U.S. PATENT DOCUMENTS

| | | | |
|---|---|---|---|
| 2002/0026502 A1* | 2/2002 | Phillips et al. | 709/219 |
| 2006/0034283 A1* | 2/2006 | Ko et al. | 370/392 |
| 2006/0067346 A1* | 3/2006 | Tucker et al. | 370/412 |
| 2007/0097675 A1* | 5/2007 | Koren et al. | 362/158 |
| 2007/0097875 A1  | 5/2007 | Bender et al. | |
| 2009/0106771 A1* | 4/2009 | Benner et al. | 719/313 |

OTHER PUBLICATIONS

Hash Function—Wikipedia, the free encyclopedia, http://en.wikipedia.org/wiki/Hash_function printed on Sep. 26, 2008 (8 pgs.).
RDMA (Remote Direct Memory Access), http://www.networkworld.com/details/5221.html printed on Aug. 8, 2008 (3 pgs.).
Remote Direct Memory Access—Wikipedia, the free encyclopedia, http://en.wikipedia.org/wiki/Remote_Direct_Memory_Access printed on Aug. 8, 2008 (2 pgs.).
WO International Search Report dated Nov. 23, 2009.

* cited by examiner

*Primary Examiner* — Ramy M Osman
(74) *Attorney, Agent, or Firm* — Weaver Austin Villeneuve & Sampson LLP

(57) ABSTRACT

In one embodiment, a first network system obtains from a second network system, as a result of an RDMA read operation or an RDMA write operation, a message and a hash of the message, contiguous thereto. The first network system generates a computed hash of the obtained message and compares the computed hash of the message with the obtained hash of the message. The first network system processes the obtained message according to whether the computed hash is equal to the obtained hash.

20 Claims, 7 Drawing Sheets

US 8,019,826 B2

RELIABLE RECEPTION OF MESSAGES WRITTEN VIA RDMA USING HASHING

BACKGROUND

1. Technical Field

The present disclosure relates generally to methods and apparatus for processing messages received via Remote Direct Memory Access (RDMA).

2. Description of the Related Art

Remote Direct Memory Access (RDMA) is a network interface card (NIC) feature that lets one computer directly access information in a memory of another computer. Specifically, via RDMA technology, the computer may read information from the memory of another computer, as well as write information to the memory of another computer, without involving either of the computers' operating systems or central processing units (CPUs).

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a first network system obtains from a second network system, as a result of an RDMA read operation or an RDMA write operation, a message and a hash of the message, contiguous thereto. The first network system generates a computed hash of the obtained message and compares the computed hash of the message with the obtained hash of the message. The first network system processes the obtained message according to whether the computed hash is equal to the obtained hash.

Specific Example Embodiments

In the following description, the contents of memory being read via an RDMA read operation or written via an RDMA write operation may be referred to as a "message." Such a message may include data and/or other information such as commands (e.g., requests). Commands may be conditional and request that the receiving system perform a specified action when a specified condition occurs. For instance, the condition may be based upon at least a portion of data provided in the message. As one example, a first system may request that a second system perform a specified action when processing reaches a particular sequence number.

The disclosed embodiments enable the system receiving a message via an RDMA read operation or RDMA write operation to ascertain whether the message is a complete and valid message. When the system determines that the message is complete and valid, it may proceed to process the message. However, the system will not process the message if the system has determined that the RDMA read operation or RDMA write operation has not successfully completed.

Figure 1:
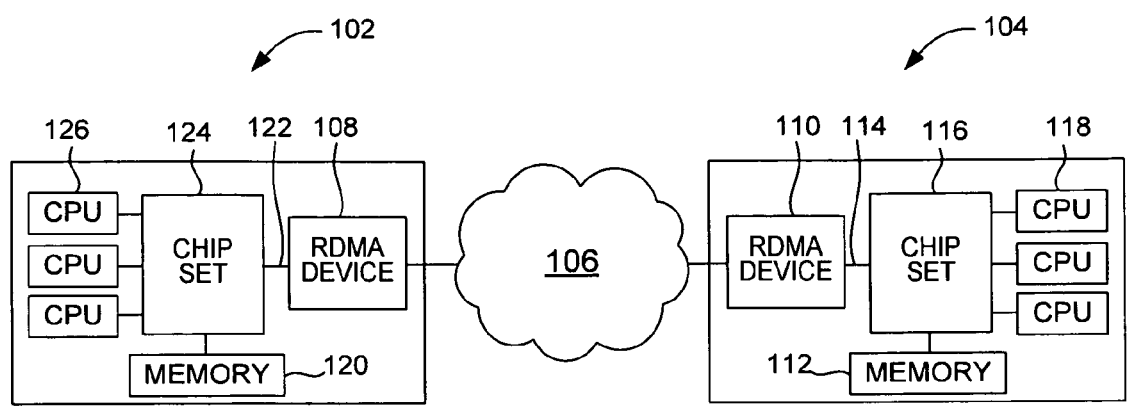
FIG. 1 is a block diagram illustrating an example system in which various embodiments may be implemented.

FIG. 1 is a block diagram illustrating an example system in which various embodiments may be implemented. As shown in FIG. 1, a first network system (e.g., computer) 102 is coupled to a second network system (e.g., computer) 104 via a network 106. Such a network may be implemented with a variety of RDMA technologies, such as Infiniband or Internet Wide Area RDMA Protocol (iWARP).

An RDMA device 108 (e.g., NIC) of the first computer 102 may communicate with an RDMA device 110 of the second computer 104. Specifically, the RDMA device 108 of the first computer 102 may send a request (e.g., read or write request) to the RDMA device 110 of the second computer 104 in order to access a memory 112 of the second computer 104. The RDMA device 110 of the second computer 104 may then implement the request (e.g., read or write request) by accessing the memory 112 via a system bus 114, such as a Peripheral Component Interconnect (PCI) bus, which may be coupled to a chip set 116 that is further coupled to the memory 112. In this manner, the RDMA device 110 of the second computer 104 can perform operations on behalf of the first computer 102. It is important to note that the memory 112 of the second computer 104 may be accessed in this manner without involvement of the central processing units (CPUs) 118 of the second computer 104.

Similarly, the RDMA device 110 (e.g., NIC) of the second computer 104 may communicate with the RDMA device 108 of the first computer 102. Specifically, the RDMA device 110 of the second computer 104 may send a request (e.g., read or write request) to the RDMA device 108 of the first computer 102 in order to access a memory 120 of the first computer 102. The RDMA device 108 of the first computer 102 may then implement the request (e.g., read or write request) by accessing the memory 120 via a system bus (e.g., PCI bus) 122, which may be coupled to a chip set 124 that is further coupled to the memory 120. In this manner, the RDMA device 108 of the first computer 102 can perform operations on behalf of the second computer 104. It is important to note that the memory 120 of the first computer 102 may be accessed in this manner without involvement of the central processing units (CPUs) 126 of the first computer 102.

Figure 2:
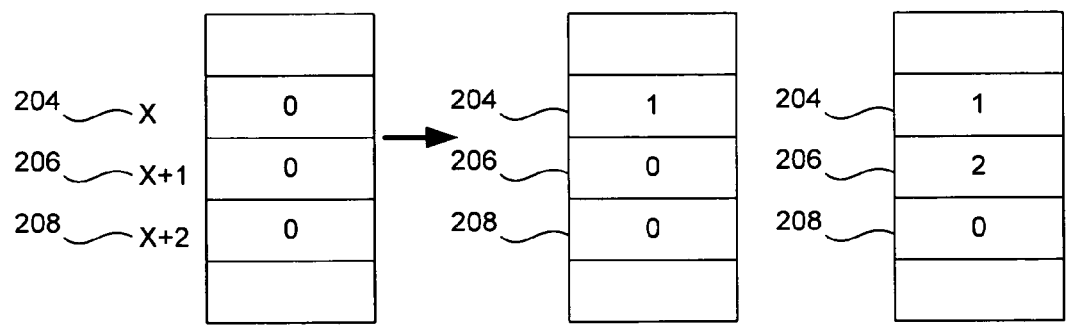
FIG. 2 is a diagram illustrating an example of memory contents throughout the process of updating the memory and problems that may result if these contents are read during the update process.

FIG. 2 is a diagram illustrating an example of memory contents throughout the process of updating the memory and problems that may result if these contents are read during the update process. Assume in this example that the RDMA device 108 of the first computer 102 has issued a read request to the RDMA device 110 of the second computer 104 in order to read contents of the memory 112 of the second computer 104. However, the CPUs 118 of the second computer 104 are updating the contents of the memory 112 of the second computer 104. During the update process, more than one computation may be performed. As a result, different blocks of the memory 112 may be updated as the computations are performed, and therefore different blocks of the memory 112 may be updated at different times.

For example, at a first instant in time, contents of the memory 112 may be represented at 202. As shown, memory blocks 204, 206, and 208 each store a value of "0." At a second instant in time, contents of the memory 112 may be represented at 210. As shown in this example, the contents of the memory block 204 have been updated to store a value of "1." At a third instant in time, contents of the memory 112 may be represented at 218. The contents of the memory block 206 have now been updated to a value of "2." Unfortunately, if the RDMA read request is issued during the middle of the update process, one or more of the memory blocks could be read before the update of those memory blocks is completed. Moreover, the memory blocks could be read out of order. In this example, the result of the read of the memory blocks 204, 206, 208 could be "0," "2," and "0," respectively, as shown at 226, even though the contents of the memory blocks 204, 206, 208 that have been read never existed at a given point in time.

Similar problems may occur as a result of remote memory updates performed via an RDMA write operation. Specifically, RDMA write operations are "one-sided." In other words, when a first RDMA of a first network system performs an RDMA write operation to write a message to memory of a second network system, the first RDMA does not notify the second network system when the RDMA write operation is complete. More specifically, neither a second RDMA of the second network system nor software running on the second network system receives a notification of completion of the RDMA write operation. Unfortunately, RDMA write operations may write data to a receiving system's memory in any order. Such ordering problems may occur when packets are received out of order by the receiving system, or due to implementation details in the RDMA devices, system bus, etc.

In order to avoid obtaining and processing an incomplete message obtained via a RDMA read operation or RDMA write operation, the disclosed embodiments enable a system to determine whether a complete message has been written and is ready for processing (rather than an incomplete message that will be at least partially overwritten by a subsequent operation). While it is possible to mark an additional memory location such as a "valid" bit to indicate that the memory has been updated, this additional memory location is also susceptible to being written out of order. As a result, the valid bit might be written before the message has become valid. It would also be possible to perform additional transactions (e.g., polling of memory locations) in order to determine whether an update of the memory has been completed. However, performing additional transactions would slow down the system and result in a less efficient use of the network.

In the disclosed embodiments, software and/or hardware may be configured on both network systems involved in an RDMA read operation or RDMA write operation, as will be described in further detail below. In accordance with one embodiment, a system preparing or generating a message to be written via an RDMA write operation or a local write operation may apply a hash function to the message to generate a hash of the message. The hash of the message may then be stored along with the message in memory in a contiguous manner. For instance, the hash of the message may be "appended" to the message and then stored. In order to delineate the separation between the message and its corresponding hash, an indicator may be stored between the message and the corresponding hash. Alternatively, both the sending and receiving network systems may be configured to identify a pre-determined number or set of bits in the message and/or the corresponding hash. While the message and/or corresponding hash may be a fixed size, the disclosed embodiments may also be implemented with messages of variable size. For example, the message could contain a field indicating the length of the message and/or corresponding hash. The hash could then be computed over the length of the message.

One example of a stored message will be described below with reference to FIG. 3. The system "receiving" the message as a result of an RDMA read or RDMA write operation may then obtain the stored hash for use in determining whether the message is a valid, complete message, as will be described in further detail below with reference to FIGS. 4A-B and FIGS. 5A-B.

Figures 3A, 3B:
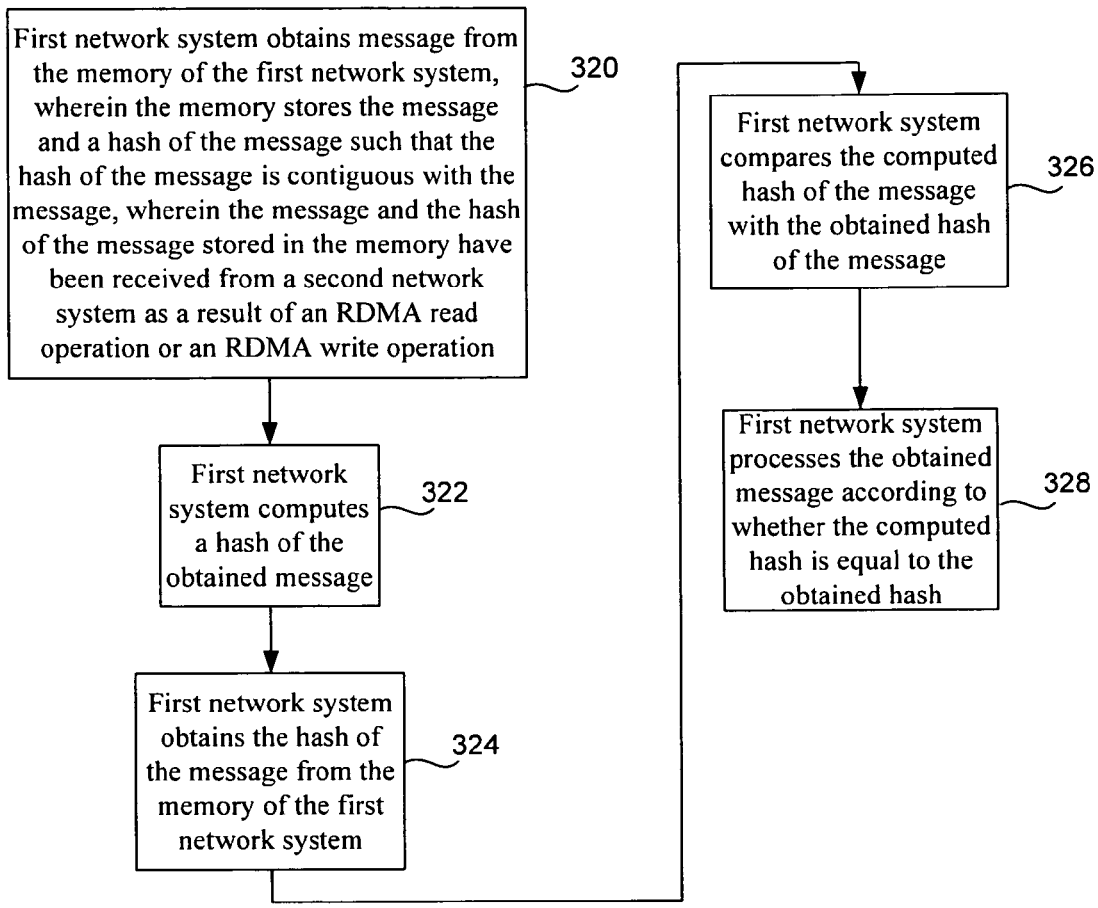
FIG. 3A is a diagram illustrating an example of the updated memory in accordance with one embodiment.
FIG. 3B is a process flow diagram illustrating an example general method of processing a message obtained via an RDMA read or write operation.

FIG. 3A is a diagram illustrating an example of the updated memory in accordance with one embodiment. In accordance with one embodiment, a hash value is calculated with respect to all data associated with a single "transaction" (e.g., each unit that would be written at a single time and that could be processed individually). The data associated with a single transaction may be referred to as a single message. The hash value may be stored in contiguous memory in the same data buffer as the message, which allows the hash value to be read or written with the same RDMA operation that transports the message. In this manner, RDMA hardware may be used as efficiently as possible to minimize the number of operations performed.

As shown in this example, the memory includes a first data buffer including a first message 302, a second data buffer including a second message 304, a third data buffer including a new, third message 306, and a fourth data buffer including a hash value 308 generated based upon the new, third message 306. In this example, the hash value 308 is stored such that it is contiguous with the new, third message 306, enabling both the third message 306 and corresponding hash value 308 to be retrieved from memory via a single read operation. It is important to note that each message may be stored in one or more data buffers. Memory may be updated in a manner such as that shown in FIG. 3A. An example method of processing a data structure such as that shown in FIG. 3A, which may be obtained as a result of an RDMA read or RDMA write operation, will be described in further detail below with reference to FIG. 3B.

In the following description, operations performed by an RDMA device are clearly specified. In all other instances, operations are described as being performed via a "network system." In other words, the network system may implement these operations via hardware and/or software. In one embodiment, software supporting RDMA read operations and RDMA write operations as disclosed herein is configured on each network system. Thus, when this software executes, the disclosed steps may be performed via a CPU (rather than an RDMA device).

FIG. 3B is a process flow diagram illustrating an example general method of ensuring that a message obtained via an RDMA read or RDMA write operation is a complete message. A first network system may obtain a message from a memory of the first network system at 320, wherein the memory stores the message and a hash of the message such that the hash of the message is contiguous with the message, wherein the message and the hash of the message stored in the memory have been received from a second network system as a result of an RDMA read operation or an RDMA write operation. The first network system may compute a hash of the obtained message at 322. The first network system may also obtain the hash of the message from the memory of the first network system at 324. The first network system may compare the computed hash of the message with the obtained hash of the message at 326 to determine whether the computed hash is equal to the obtained hash. The first network system may then process the obtained message at 328 according to the result of the comparison.

The process described with reference to FIG. 3B may be applied in the case of an RDMA read operation or an RDMA write operation. Methods of ensuring that a complete message has been written before processing the message obtained via an RDMA read will be described in further detail below with reference to FIGS. 4A-B. Methods of performing an RDMA write implementing a format such as that shown in FIG. 3A to ensure that a complete message has been written before processing the message will be described in further detail below with reference to FIGS. 5A-B.

As described above, when a network system updates its local memory, the network system may generate a hash of the message being stored and store the hash of the message with the message in a contiguous manner. The network system may store the hash of the message and the message in the same operation, or in two separate operations. The message and corresponding hash may then be retrieved via an RDMA read operation.

Figure 4A:
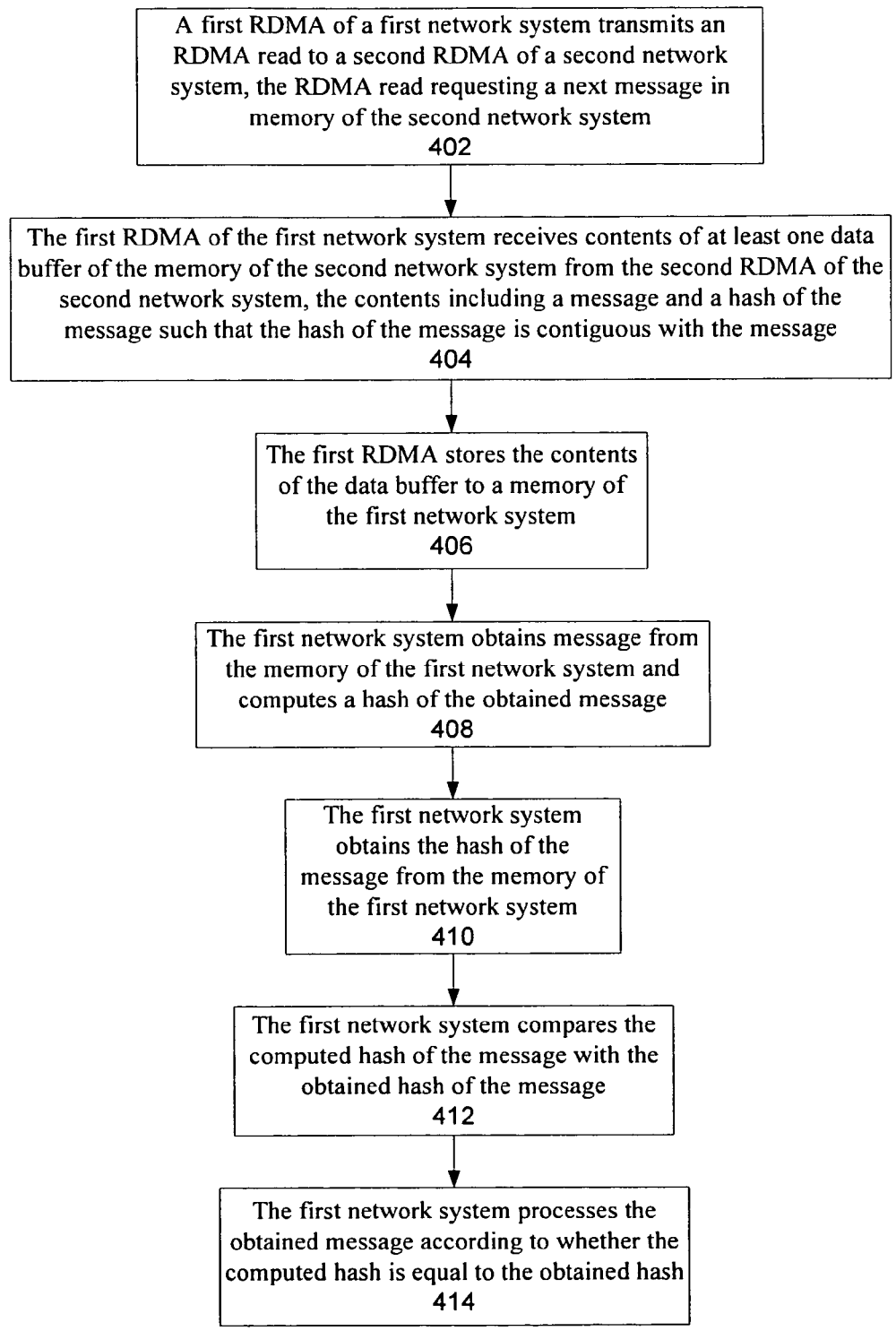
FIG. 4A is a process flow diagram illustrating an example general method of reading from memory via RDMA.

FIG. 4A is a process flow diagram illustrating an example general method of reading from memory via an RDMA read operation. A first RDMA of a first network system may transmit an RDMA read to a second RDMA of a second network system at 402, where the RDMA read requests a next message in memory of the second network system. The first RDMA of the first network system may then receive contents of a block of the memory of the second network system from the second RDMA of the second network system at 404, where the contents include a message and a hash of the message such that the hash of the message is contiguous with the message. The first RDMA may then store the contents of the data buffer to a memory of the first network system at 406. The first network system may obtain the message from the memory of the first network system and compute a hash of the obtained message 408. The first network system may also obtain the hash of the message from the memory of the first network system at 410. The message and the hash of the message may be retrieved from the memory of the first network system in a single read operation. The first network system may then compare the computed hash of the message with the obtained hash of the message at 412 to determine whether the computed hash is equal to the obtained hash.

The first network system may then process the obtained message according to the result of the comparison at 414. More specifically, if the computed hash is equal to the obtained hash, the first network system may conclude that a complete, valid message has been successfully read from the memory of the second network system. The first network system then may process the obtained message. Processing may include storing the message and/or further processing, as will be described in further detail below with reference to FIG. 4B. However, if the computed hash is not equal to the obtained hash, the message (or the hash of the message) is still being updated in the memory of the first network system. Therefore, the first network system may conclude that a complete, valid message has not yet successfully been retrieved from the memory of the second network system. The first network system may then repeat steps 408-414 until it determines that a valid, complete message has been retrieved.

Figure 4B:
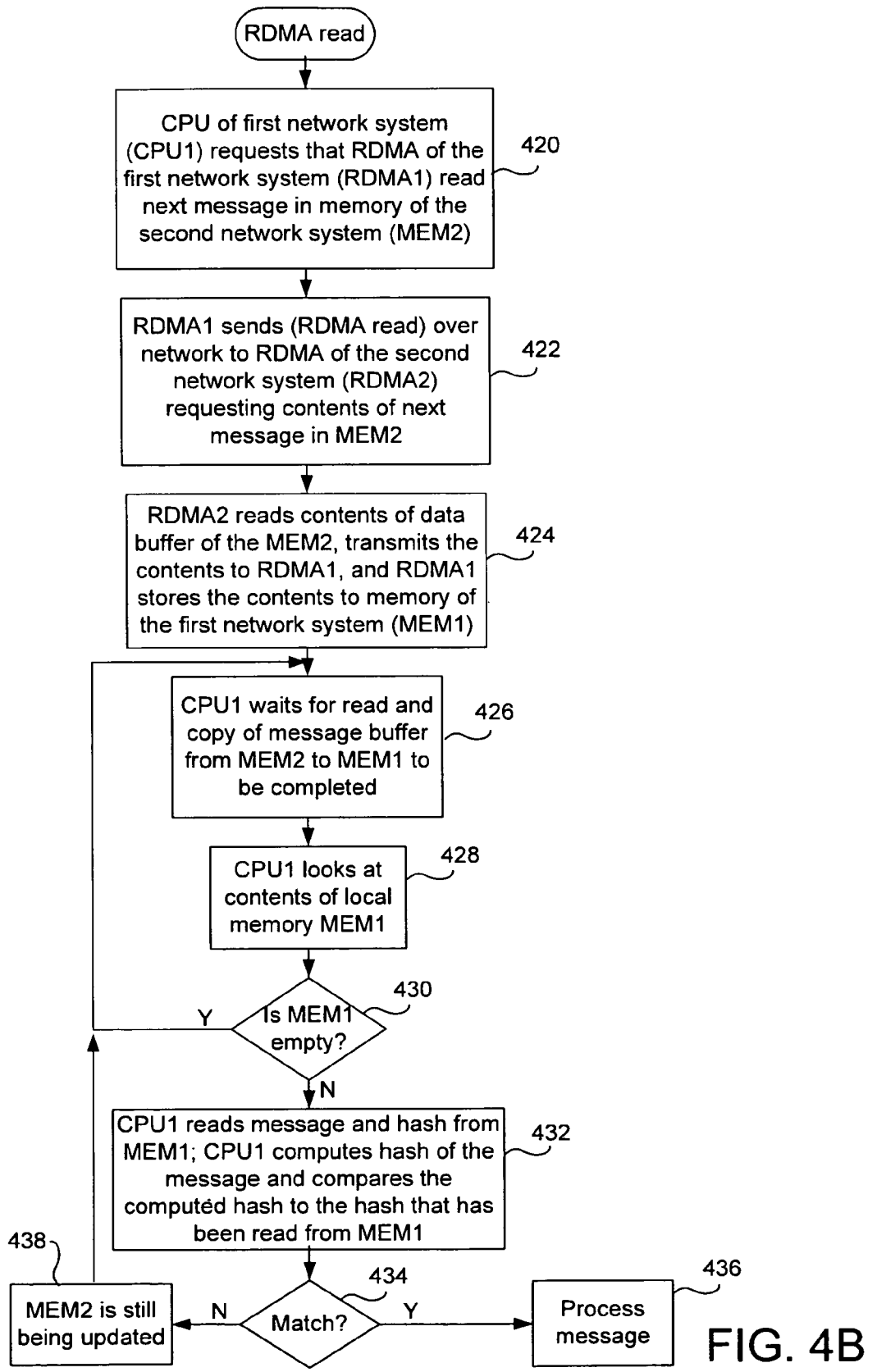
FIG. 4B is a process flow diagram illustrating an example method of reading from memory via RDMA.

FIG. 4B is a process flow diagram illustrating an example method of reading from memory via RDMA technology. In this example, it is assumed that a second network system has previously updated its memory such that a message and a hash of the message are stored in a contiguous manner. The message may include a request that a specified action be performed when a specified condition occurs. A user application may initiate a CPU of first network system (CPU1) to request that an RDMA of the first network system (RDMA1) read the next message in memory of the second network system (MEM2) at 420. RDMA1 may then send an RDMA read over the network to an RDMA of the second network system (RDMA2) requesting contents of the next message in MEM2 at 422. RDMA2 may read the contents of at least one data buffer of MEM2 and transmit the contents to RDMA1, enabling RDMA1 to store the contents to memory of the first network system (MEM1) at 424. CPU1 may wait for a notification that the read and copy of a message buffer from MEM2 to MEM1 to be completed at 426. CPU1 may then examine the contents of local memory MEM1 at 428. If MEM1 is determined to be empty at 430, the process may repeat at 426. When MEM1 is determined not to be empty, CPU1 may read the message from MEM1 and corresponding hash from MEM1, compute a hash of the message and compare the computed hash to the hash that has been read from MEM1 at 432. If the computed hash is determined to match the hash that has been read from memory at 434, the message may be processed at 436. However, if the computed hash does not match the hash that has been read from memory, the first network system may conclude that MEM2 is still being updated at 438, and the process may be repeated at 426.

Figure 5A:
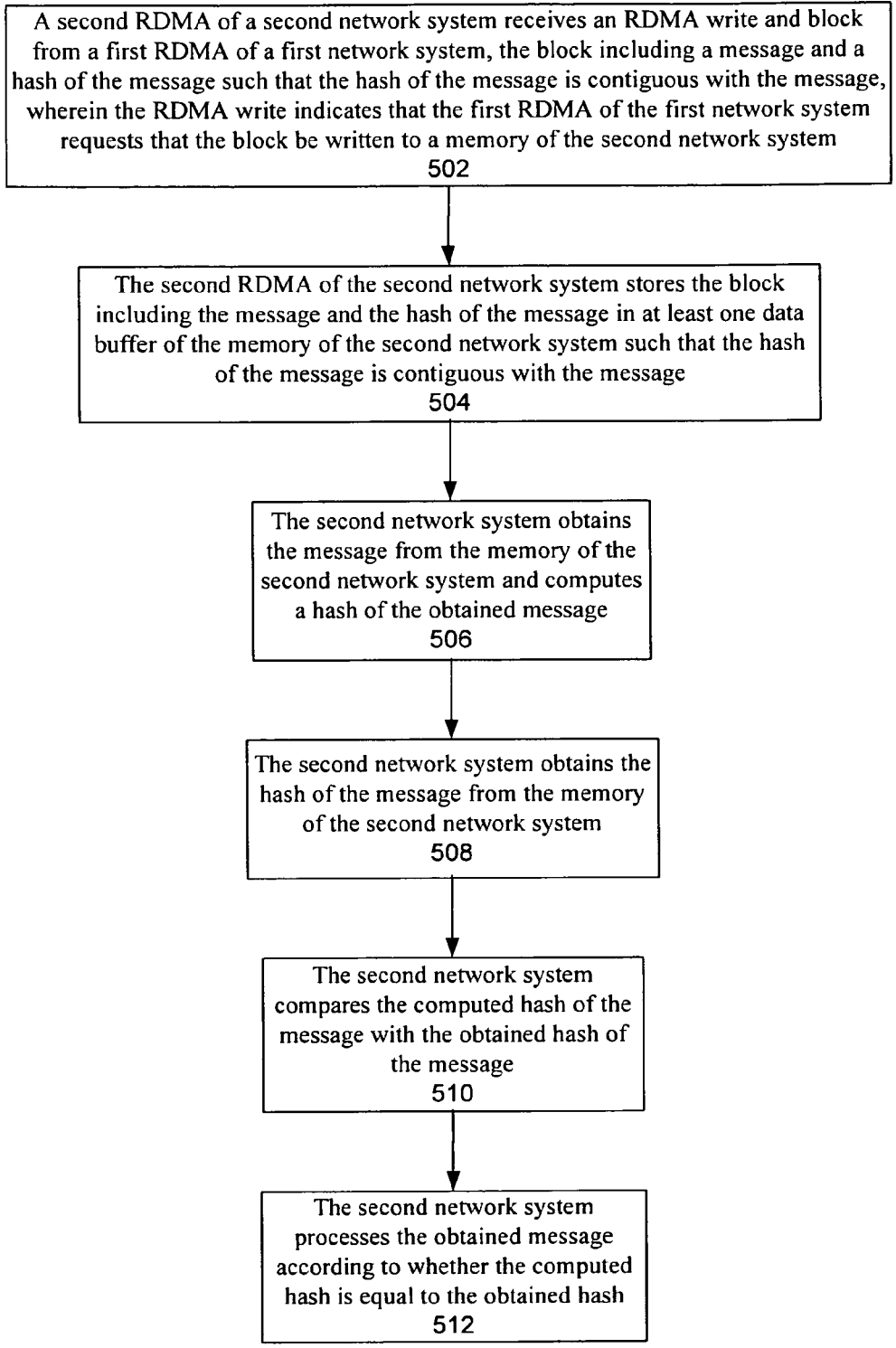
FIG. 5A is a process flow diagram illustrating an example general method of writing to memory via RDMA.

FIG. 5A is a process flow diagram illustrating an example general method of writing to memory via an RDMA write operation. A second RDMA of a second network system may receive a block and RDMA write from a first RDMA of a first network system, where the RDMA write indicates that the first RDMA of the first network system requests that the block be written to a memory of the second network system at 502. The block may include a message and a hash of the message such that the hash of the message is contiguous with the message. The second RDMA of the second network system may store the block including the message and the hash of the message in at least one data buffer of the memory of the second network system such that the hash of the message is contiguous with the message at 504. The second network system may obtain the message from the second memory and compute a hash of the obtained message at 506. The second network system may also obtain the hash of the message from the memory of the second network system at 508. The obtaining of the message from the memory of the second network system and obtaining the hash of the message from the memory of the second network system (as described, respectively in steps 506 and 508) may be performed in a single read operation. The second network system may compare the computed hash of the message with the obtained hash of the message at 510 to determine whether the computed hash is equal to the obtained hash.

The second network system may then process the obtained message according to the result of the comparison at 512. More specifically, if the computed hash is equal to the obtained hash, the second network system may conclude that a complete, valid message has been successfully written by the first network system to the memory of the second network system. The second network system may then process the obtained message. However, if the computed hash is not equal to the obtained hash, the RDMA write is still in process. In other words, the message (or the hash of the message) is still being updated in the memory of the second network system. Therefore, the second network system may conclude that a complete, valid message has not yet successfully been written to the memory of the second network system. The second network system may then repeat 506-512 until it determines that a valid, complete message has been retrieved from its memory. An example of performing an RDMA write and subsequent message processing will be described in further detail below with reference to FIG. 5B.

Figure 5B:
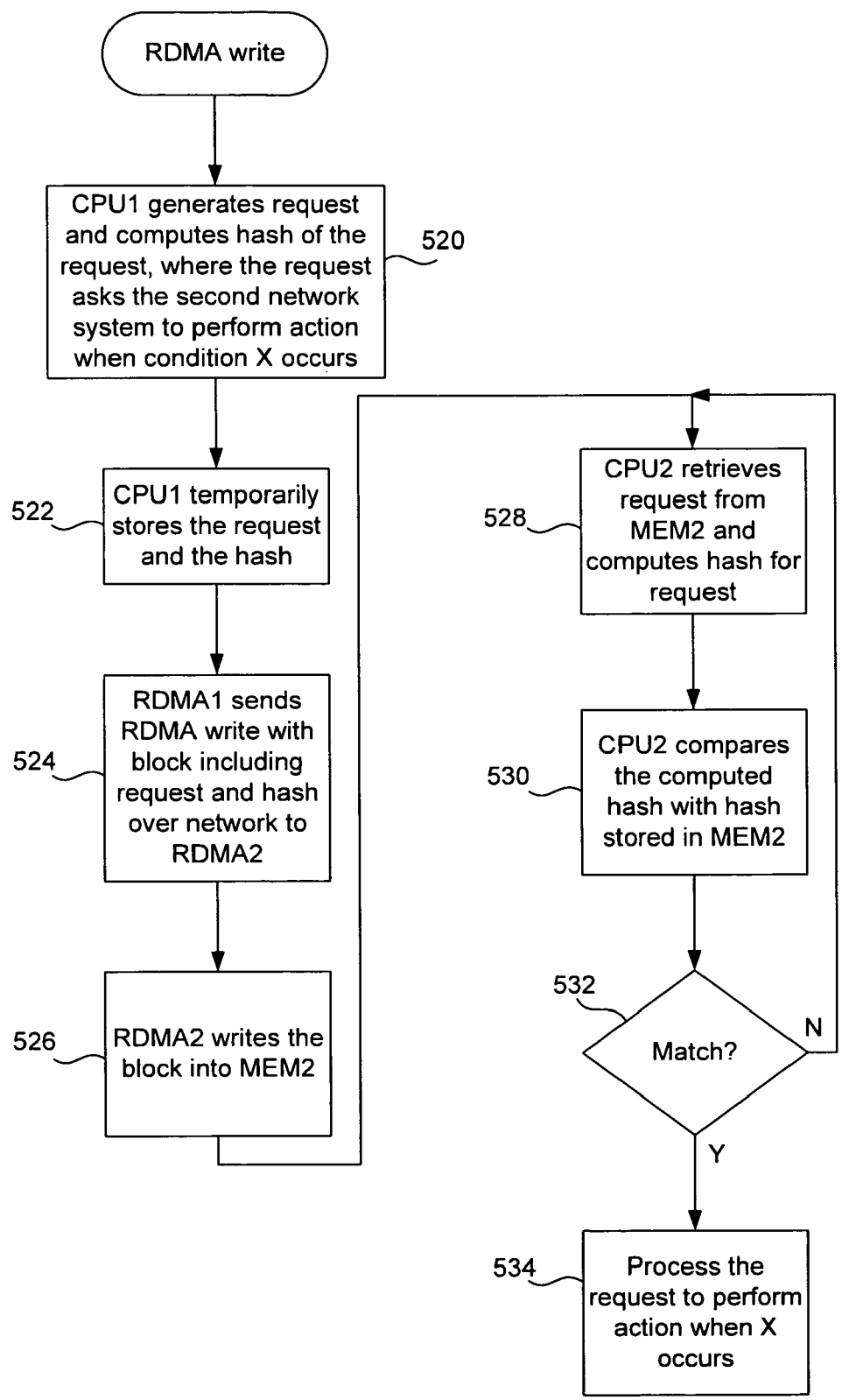
FIG. 5B is a process flow diagram illustrating an example method of writing to memory via RDMA.
Figure 6:
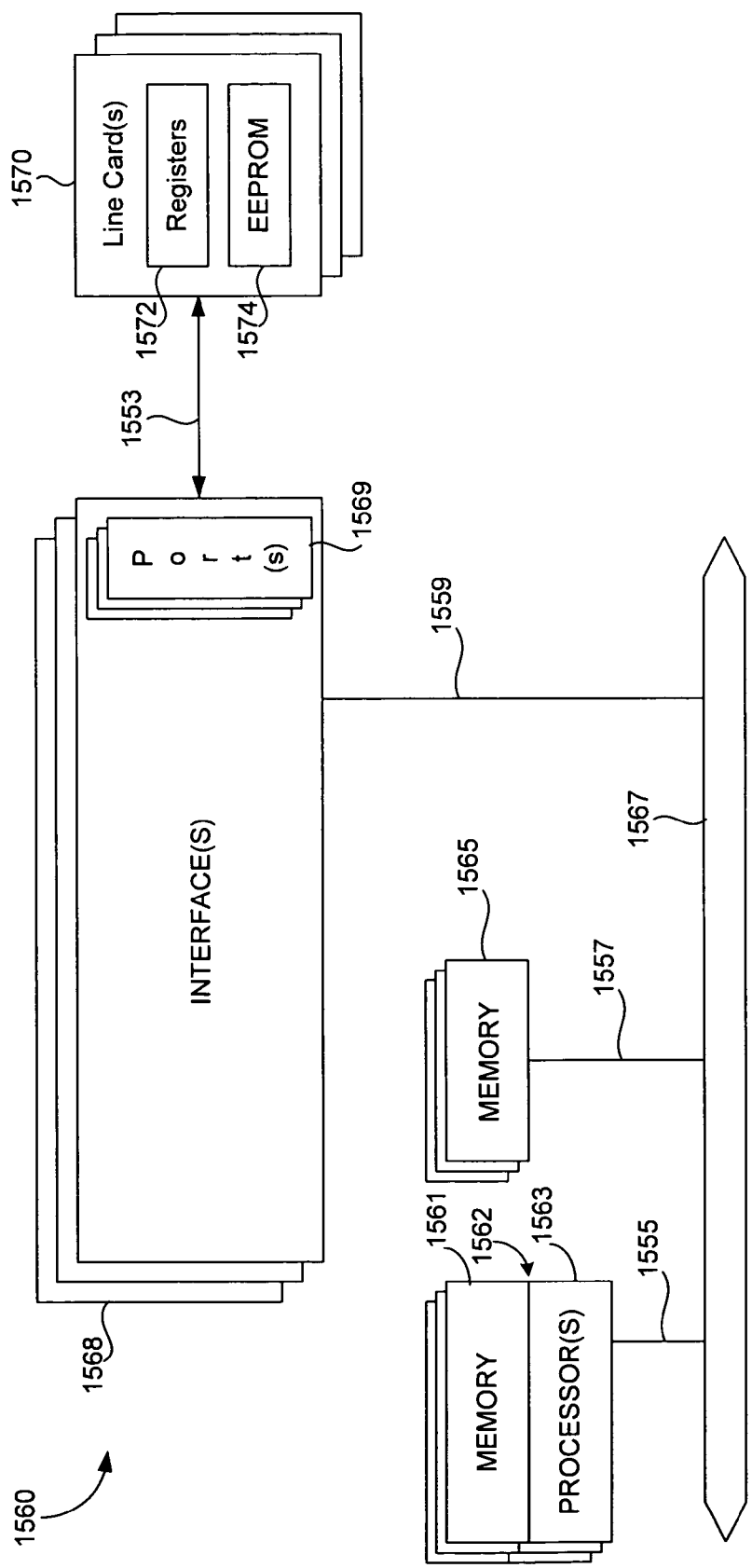
FIG. 6 is a diagrammatic representation of an example network device in which various embodiments may be implemented.

FIG. 5B is a process flow diagram illustrating an example method of writing to memory via RDMA technology. In this example, the message includes a request that a second network system perform a specified action when a specified condition occurs. CPU1 generates the request and computes a hash of the request, where the request asks the second network system to perform the specified action when the specified condition, condition X, occurs at 520. CPU1 may temporarily store the request and the hash such that they are stored in a contiguous manner as a block at 522. RDMA1 may send an RDMA write with the block including the request and the hash over the network to RDMA2 at 524. RDMA2 may write the block into MEM2 at 526. CPU2 may retrieve the request from MEM2 and compute the hash for the request at 528. CPU2 may then compare the computed hash with the hash that has been stored in MEM2 at 530 to determine whether the computed hash is equal to the previously stored hash. If the computed hash is determined to match the previously stored hash at 532, CPU2 may process the request to perform the specified action when the condition X occurs at 534. If the computed hash does not match the previously stored hash, the process may repeat at 528.

Other Embodiments

Generally, the disclosed techniques may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid implementation of the disclosed embodiments may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, various embodiments may be implemented in specially configured routers or servers available from Cisco Systems, Inc. of San Jose, Calif. A general architecture for some of these machines will appear from the description given below. In an alternative embodiment, the disclosed techniques may be implemented on a general-purpose network host machine such as a personal computer or workstation. Further, the disclosed embodiments may be at least partially implemented on a card (e.g., an interface card) for a network device or a general-purpose computing device.

Referring now to FIG. 5, a network device 1560 suitable for implementing the disclosed embodiments includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. The CPU 1562 may accomplish these functions under the control of software including an operating system (e.g. Windows NT), and any appropriate application software.

CPU 1562 may include one or more processors 1563 such as a processor from the Motorola family of microprocessors or the MIPS family of microprocessors. In an alternative embodiment, processor 1563 may include specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing messages or other data, programming instructions, etc.

The interfaces 1568 are typically provided as interface cards (sometimes referred to as "line cards"). Generally, they control the sending and receiving of data packets over the network and sometimes support other peripherals used with the network device 1560. One or more of the interfaces 1568 may include an RDMA device. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 5 illustrates one specific network device, it is by no means the only network device architecture on which the disclosed embodiments can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving a Remote Direct Memory Access (RDMA) write and a block by a second RDMA of a second network system from a first RDMA of a first network system, the block including a message and a hash of the message such that the hash of the message is contiguous with the message, wherein the RDMA write indicates that the first RDMA of the first network system requests that the block be written to a memory of the second network system;
   storing by the second RDMA of the second network system the block including the message and the hash of the message in at least one data buffer of the memory of the second network system such that the hash of the message is contiguous with the message;
   obtaining the message by the second network system from the memory of the second network system and computing by the second network system a hash of the obtained message;
   obtaining the hash of the message from the memory of the second network system;
   determining by the second network system whether the computed hash of the message is equal to the obtained hash of the message; and
   processing the obtained message in accordance with the result of the determination.

2. The method as recited in claim 1, wherein the obtained message is processed when the computed hash is equal to the obtained hash.

3. The method as recited in claim 2, wherein the message includes a request that the second network system perform a specified action when a specified condition occurs, the method further comprising:
   performing the specified action when the specified condition occurs.

4. The method as recited in claim 3, wherein the message further includes data, and wherein the specified condition is based upon the included data.

5. The method as recited in claim 1, wherein when the computed hash is not equal to the obtained hash, repeating the obtaining the message, computing, obtaining the hash, and determining steps.

6. The method as recited in claim 1, further comprising:
   generating the message by the first network system; and
   computing the hash of the message by the first network system.

7. The method as recited in claim 1, wherein obtaining the message from the memory of the second network system and obtaining the hash of the message from the memory of the second network system are performed in a single read operation.

8. A method, comprising:
   transmitting a Remote Direct Memory Access (RDMA) read by a first RDMA of a first network system to a second RDMA of a second network system, the RDMA read requesting a next message in memory of the second network system;
   receiving by the first RDMA of the first network system contents of at least one data buffer of the memory of the second network system from the second RDMA of the second network system, the contents including a message and a hash of the message such that the hash of the message is contiguous with the message;
   storing by the first RDMA the contents of the data buffer to a memory of the first network system;
   obtaining the message from the memory of the first network system and computing by the first network system a hash of the obtained message;
   obtaining the hash of the message from the memory of the first network system;
   determining by the first network system whether the computed hash of the message is equal to the obtained hash of the message; and
   processing the obtained message according to the result of the determination.

9. The method as recited in claim 8, wherein the obtained message is processed when the computed hash is equal to the obtained hash.

10. The method as recited in claim 9, wherein the message includes a request that a specified action be performed when a specified condition occurs, the method further comprising:
    performing the specified action when the specified condition occurs.

11. The method as recited in claim 10, wherein the message further includes data, and wherein the specified condition is based upon the data.

12. The method as recited in claim 8, wherein when the computed hash is not equal to the obtained hash, repeating the obtaining the message, computing a hash of the message, obtaining the hash of the message, and determining steps.

13. The method as recited in claim 8, further comprising:
    receiving the RDMA read by the second RDMA of the second network system from the first RDMA of the first network system;
    reading by the second RDMA of the second network system at least one data buffer of the memory of the second network system; and
    transmitting by the second RDMA of the second network system contents of the data buffer to the first RDMA of the first network system.

14. The method as recited in claim 8, further comprising:
    wherein obtaining the message from the memory of the first network system and obtaining the hash of the message from the memory of the first network system are performed in a single read operation.

15. An apparatus, comprising:
    a Remote Direct Memory Access (RDMA) device; and
    a processor and a memory, at least one of the processor or the memory being adapted for:
    obtaining a message from the memory, wherein the memory stores the message and a hash of the message such that the hash of the message is contiguous with the message, wherein the message and the hash of the message stored in the memory have been received from another network system as a result of an RDMA read operation or an RDMA write operation;
    computing a hash of the obtained message;
    obtaining the hash of the message from the memory;
    determining whether the computed hash of the message is equal to the obtained hash of the message; and processing the obtained message in accordance with the result of the determination.

16. The apparatus as recited in claim 15, wherein the obtained message is processed when the computed hash is equal to the obtained hash.

17. The apparatus as recited in claim 15, wherein when the computed hash is not equal to the obtained hash, repeating the obtaining the message, computing, obtaining the hash of the message, and determining steps.

18. The apparatus as recited in claim 15, wherein the message and the hash of the message are obtained from memory via a single read operation.

19. The apparatus as recited in claim 15, wherein the message includes a request that a specified action be performed when a specified condition occurs.

20. A non-transitory computer-readable medium storing thereon computer-readable instructions, comprising:
- instructions for obtaining a message by a first network system from a memory of the first network system, wherein the memory stores the message and a hash of the message such that the hash of the message is contiguous with the message, wherein the message and the hash of the message stored in the memory have been received from a second network system as a result of a Remote Direct Memory Access (RDMA) read operation or an RDMA write operation;
- instructions for computing by the first network system a hash of the obtained message;
- instructions for obtaining the hash of the message from the memory of the first network system;
- instructions for determining by the first network system whether the computed hash of the message is equal to the obtained hash of the message; and
- instructions for processing the obtained message in accordance with the result of the determination.

\* \* \* \* \*